(12) United States Patent
Labib et al.

(10) Patent No.: US 9,312,766 B2
(45) Date of Patent: Apr. 12, 2016

(54) DIGITAL SERIALIZER BASED PULSEWIDTH MODULATOR CONTROLLER

(71) Applicant: ALCATEL-LUCENT CANADA INC., Ottawa (CA)

(72) Inventors: Rami Labib, Ottawa (CA); James Michael Schriel, Ottawa (CA)

(73) Assignee: Alcatel Lucent, Boulogne-Billancourt (FR)

( * ) Notice: Subject to any disclaimer, the term of this patent is extended or adjusted under 35 U.S.C. 154(b) by 182 days.

(21) Appl. No.: 13/928,516

(22) Filed: Jun. 27, 2013

(65) Prior Publication Data

US 2015/0002117 A1   Jan. 1, 2015

(51) Int. Cl.
  *H02M 3/158*  (2006.01)
  *H02M 3/157*  (2006.01)
  *H02M 1/14*  (2006.01)
  *H02M 1/00*  (2007.01)

(52) U.S. Cl.
  CPC .............. *H02M 3/158* (2013.01); *H02M 3/157* (2013.01); *H02M 1/14* (2013.01); *H02M 2001/008* (2013.01)

(58) Field of Classification Search
  CPC ....... H02M 3/139; H02M 1/08; H02M 3/158; H03K 7/08; H03K 7/107
  USPC .......................... 332/109; 327/172, 175, 176
  See application file for complete search history.

(56) References Cited

U.S. PATENT DOCUMENTS

| | | | |
|---|---|---|---|
| 6,775,164 B2 | 8/2004 | Wong et al. | |
| 6,822,588 B1* | 11/2004 | Marshall et al. | 341/50 |
| 7,932,761 B1 | 4/2011 | Esposito | |
| 8,462,906 B1* | 6/2013 | Ding | 375/355 |
| 2007/0098112 A1* | 5/2007 | Kim et al. | 375/312 |
| 2007/0176815 A1 | 8/2007 | Kost et al. | |

OTHER PUBLICATIONS

International Search Report for PCT/CA2014/050606 dated Oct. 2, 2014.
Hwu, et al., "Applying a counter-based PWM control scheme to an FPGA-based SR forward converter", Applied Power Electronics Conference and Exposition, 2006, APEC'06. Twenty-First Annual IEEE.IEEE, 2006.

* cited by examiner

*Primary Examiner* — Joseph Chang
*Assistant Examiner* — Jeffrey Shin
(74) *Attorney, Agent, or Firm* — Kramer & Amado, P.C.

(57) ABSTRACT

Various exemplary embodiments relate to a method performed by a pulsewidth modulation (PWM) controller, the method including: receiving a control input including PWM parameters; producing inputs to a digital serializer, wherein the inputs result in a digital serializer output that is pulsewidth modulated according to the PWM parameters; receiving a feedback control input; and modifying inputs to a digital serializer based upon the feedback control input.

18 Claims, 5 Drawing Sheets

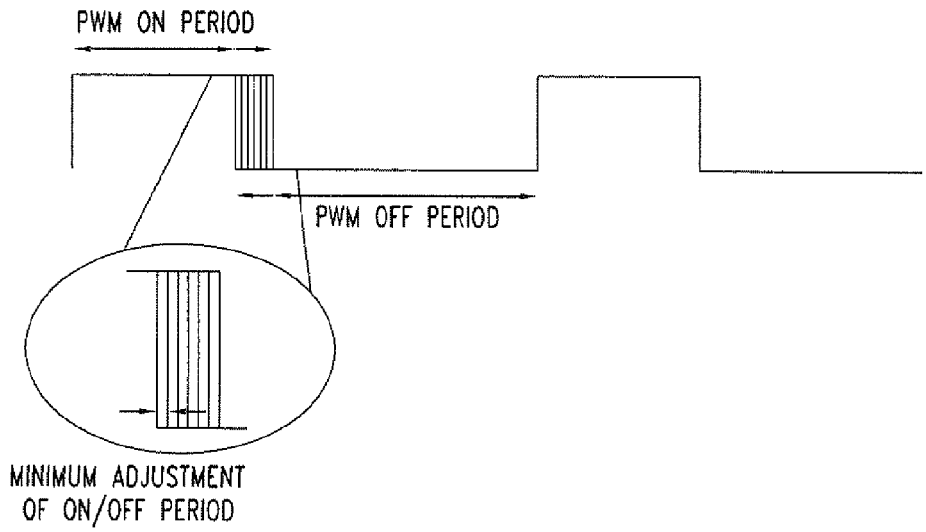
FIG. 5
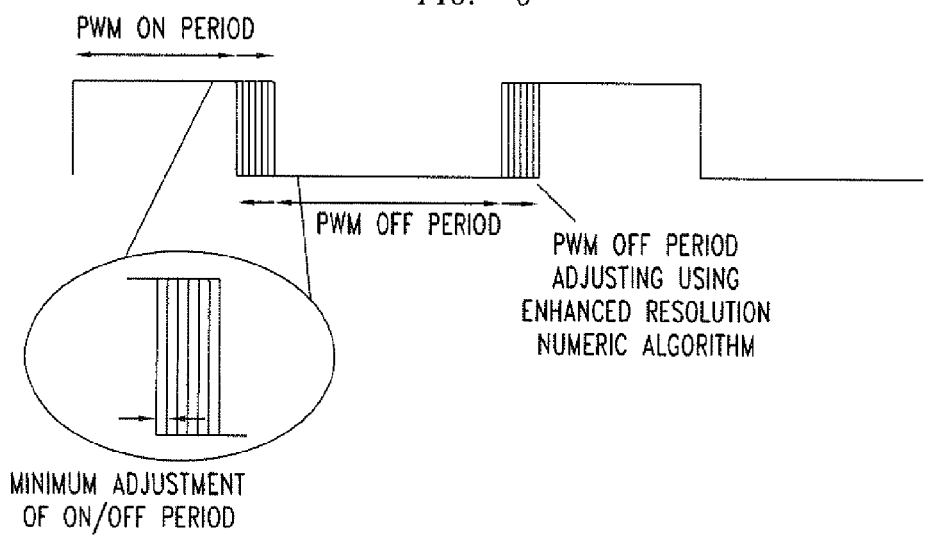
FIG. 6
FIG. 7
| | PULSE REPETITION INTERVAL | | |
|---|---|---|---|
| PWM ON TIME | | 2047 | 2048 | 2049 |
| 125 | 0.061065 | 0.061035 | 0.061005 |
| 126 | 0.061153 | 0.061523 | 0.061493 |
| 127 | 0.062042 | 0.062012 | 0.061981 |
| 128 | 0.062531 | 0.0625 | 0.062469 |
| 129 | 0.063019 | 0.062988 | 0.062958 |

DIGITAL SERIALIZER BASED PULSEWIDTH MODULATOR CONTROLLER

TECHNICAL FIELD

Various exemplary embodiments disclosed herein relate generally to pulsewidth modulated (PWM) DC-DC power supply controller.

BACKGROUND

Pulsewidth modulation (PWM) may be used to control various electrical circuits and systems. For example, PWM may be used to control DC-DC converters, electric motors, lighting systems, audio amplifiers, etc. Embodiments of PWM controllers will be described below in the context of DC-DC power supplies, but the PWM controller embodiments may be used to control various other systems as well.

PWM control of a DC-DC power supply requires very precise adjustment of PWM ON/OFF periods to achieve the required ripple on the output DC rails. Previous solutions could only achieve this level of precision in the analog domain.

FIG. 1 illustrates a simple DC-DC power supply according to the prior art. The DC-DC power supply 100 includes an operational amplifier 110, a comparator 120, a ramp generator 130, and a boost converter 140. The boost converter includes an inductor 142, switching transistor 144, a diode 146, and a capacitor 148. The input voltage $V_{in}$ applied to the inductor 142 which is connected to the transistor switch 144 which opens and closes with a specified duty cycle. The result is an output voltage $V_{out}$ that is proportional to $V_{in}$ according to the duty cycle. Accordingly, as the duty cycle of the switch 140 varies, different values for $V_{out}$ may be obtained. The boost converter is but one of many different switched designs, where a PWM input signal drives an output voltage that depends upon the duty cycle of the PWM input signal. The operational amplifier 110, the comparator 120, and the ramp generator 130 act as a pulsewidth modulator.

The DC-DC power supply operates by feeding back a sample of the output voltage and subtracting this voltage from a reference voltage to establish a small error signal (VERROR) using the operational amplifier 110. This error signal is compared to an oscillator ramp signal using the comparator 120. second comparator 120 outputs a digital output (PWM) that operates the power switch. When the circuit output voltage changes, VERROR also changes and thus causes the comparator threshold to change. Consequently, the output pulse width also changes. This duty cycle change then moves the output voltage to reduce the error signal to zero, thus completing the control loop.

This method allows analog control that achieves very fine granularity adjustments to the PWM signal. Other prior art systems use delay lines to achieve required PWM granularity.

These and other prior solutions cannot support scaling to a very large number of PWM controllers. Further, the prior art requires special circuits to control the PWM. This limits the number of instances that can be realized in a given design.

SUMMARY

A brief summary of various exemplary embodiments is presented below. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

Various exemplary embodiments relate to a method performed by a pulsewidth modulation (PWM) controller, the method including: receiving a control input including PWM parameters; producing inputs to a digital serializer, wherein the inputs result in a digital serializer output that is pulsewidth modulated according to the PWM parameters; receiving a feedback control input; and modifying inputs to a digital serializer based upon the feedback control input.

Various exemplary embodiments relate to a method performed by a pulsewidth modulation (PWM) controller including a digital serializer, the method comprising: receiving a control input including PWM parameters; determining N and M based upon the PWM parameters, wherein N is the number of ON discrete time periods and M is the number of OFF discreet time periods; producing a plurality of digital serializer input data words corresponding to N ON discreet time periods and M OFF discreet time periods; and applying the plurality of digital serializer input data words to the digital serializer to produce a PWM signal.

Various exemplary embodiments relate to a pulsewidth modulation (PWM) controller including: a digital serializer configured to receive a parallel input data stream and to produce a output serial data stream based upon the input parallel data stream; and a loop controller including an output connected to the digital serializer and an input configured to receive a feedback control input, wherein the loop controller is configured to output a parallel input data stream to the digital serializer based upon the feedback control input wherein the output serial data stream from the digital serializer has desired PWM parameters.

BRIEF DESCRIPTION OF THE DRAWINGS

In order to better understand various exemplary embodiments, reference is made to the accompanying drawings, wherein:

FIG. 5 illustrates an example of the output from the digital serializer;

FIG. 6 illustrates an example of the output from the digital serializer when the PWM OFF period is adjusted; and FIG. 7 illustrates a table that shows how to vary the PWM ON and PWM OFF times to achieve a desired duty cycle.

To facilitate understanding, identical reference numerals have been used to designate elements having substantially the same or similar structure and/or substantially the same or similar function.

DETAILED DESCRIPTION

Below is described an embodiment of a digital DC-DC power supply controller. This embodiment presents a unique method for controlling the pulse-width modulation (PWM) signals that drive the DC-DC power stage FETs. The PWM controller described below may also be used in other systems using a PWM controller, for example, motor control, lighting control, audio amplifiers, etc.

Embodiments of the PWM controller described below may be implemented in a digital form that permits flexible design expansion and the use of parameters to achieve various design and performance characteristics. Such design variations in the analog discrete solutions usually require component value changes and hardware modification. The limitations of the analog PWM controllers is hence overcome by the PWM controller described below.

Because of the latest floating point gate array (FPGA) technology, I/O's running above 1 Gb/sec. and clock rates over 250 Mhz are now available. The use of digital serializers in such FPGAs enables the granularity in a PWM signal to achieve an equivalent, if not better frequency response and low ripple on DC-DC converter power rails using a digital design technique versus those previously achieved in purely analog designs.

Figure 1:
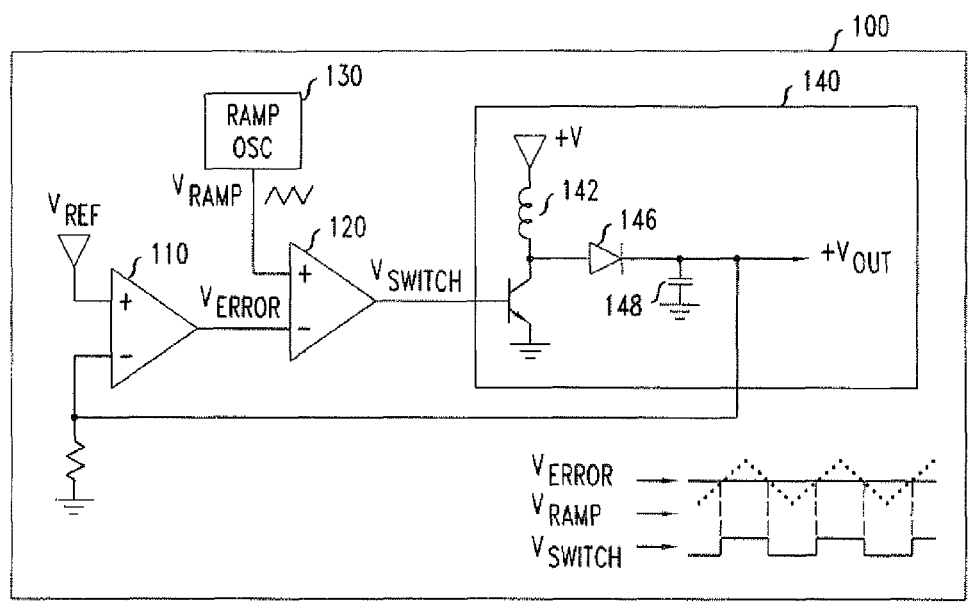
FIG. 1 illustrates a simple DC-DC power supply according to the prior art.
Figure 2:
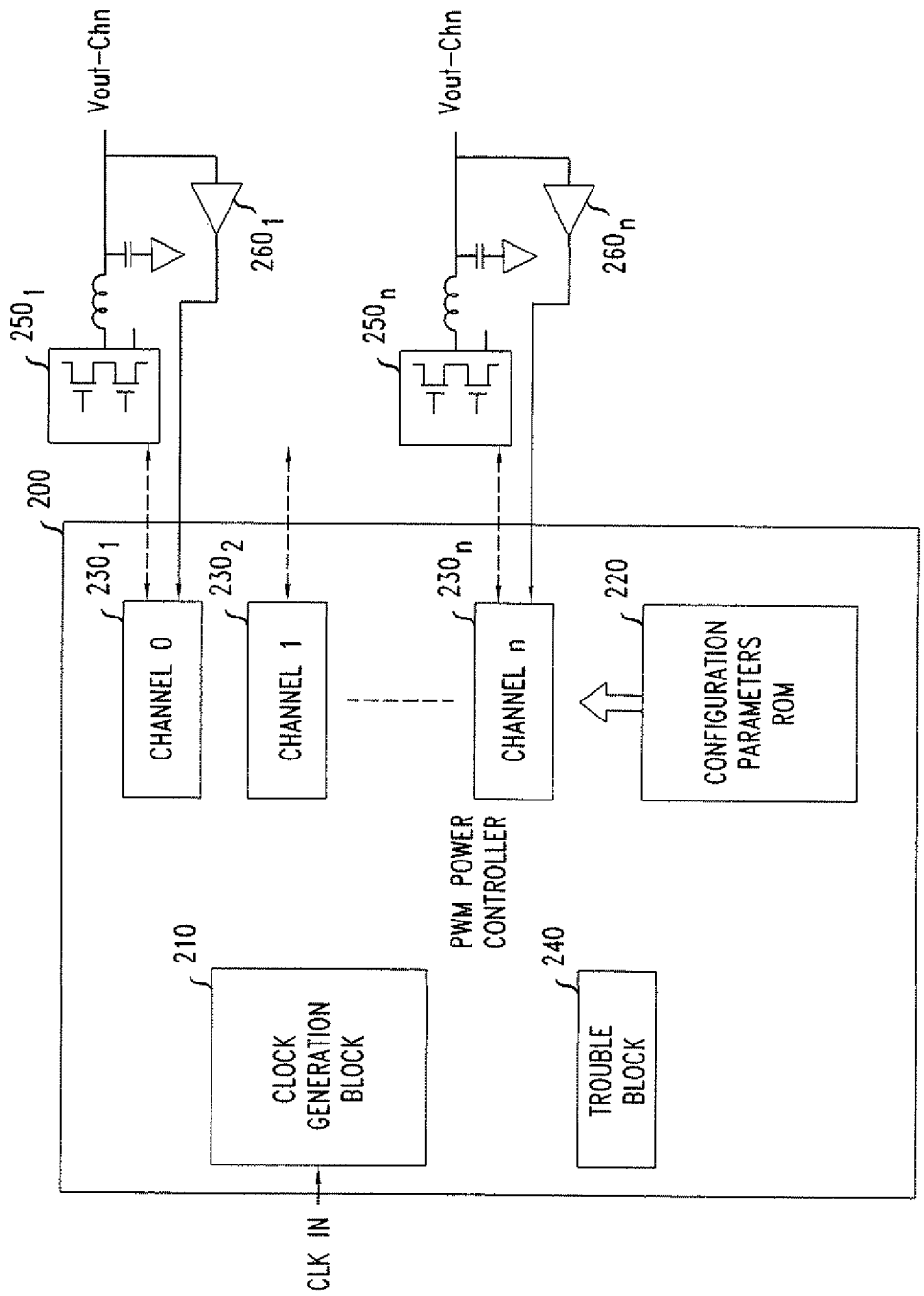
FIG. 2 illustrates a multi-channel PWM controller that drives multiple DC-DC converters.

FIG. 2 illustrates a multi-channel PWM controller that drives multiple DC-DC converters. The PWM controller 200 may include a clock generation block 210, a configuration parameters memory 220, N channel blocks $230_n$, and a trouble block 240. Each of the N channel blocks 230 has a corresponding DC-DC converter circuit $250_n$ and feedback A/D converter $260_n$.

The PWM controller 200 may be an FPGA as described above. Such FPGAs my include digital serializer hardware that takes a parallel input data stream and outputs a serial data stream. SERDES is an example of such digital serializer technology that is frequently found on digital chips.

The clock generation block 210 receives a clock signal CLK IN and produces and distributes clock signals for use in the PWM controller 200. The clock signal CLK IN may be scaled up or down by the clock generation block 210 to produce clock signals for use in the PWM controller 200.

The configuration parameters memory 220 may store configuration data used to configure the channel blocks. Such configuration data may include duty cycle, pulse repetition frequency, and/or pulsewidth information for each channel. Further parameters may include digital filter weights for implementing a digital feedback filter that provides a feedback loop for the DC-DC converter. A user or designer of the DC-DC power converter may input various parameters to implement specific desired PWM controller 200 characteristics as well as DC-DC power convertor characteristics. This may be accomplished with a software tool that allows for the input of parameters and the modeling of system performance. Such a tool may include a spreadsheet or other application that produces the parameter data to be loaded into the configuration parameters memory 220. The configuration parameters memory 220 may be implemented using any type of volatile or non-volatile memory.

A trouble block 240 may be included that detects problems with the various channel blocks 230 and records data related to such problems. Such problems may include outages, failures, over or under voltage conditions, etc. Such information may be read by a user of the system powered by the DC-DC converter or some other system manager. The trouble information allows the user or system manager to take any necessary corrective actions.

The channel blocks 230 receive a clock signal from the clock generation block 210 and parameter data from the configuration parameter memory 220 and produce a pulsewidth modulated signal. The channel blocks 230 may be implemented using a digital serializer found on the PWM power controller 200. The channel blocks 230 will be described in greater detail below.

The DC-DC converter circuits 250 receive a PWM control signal from the channel blocks 230. As described above the DC-DC converter converts a first voltage level with an input DC voltage to a second voltage level of an output DC voltage. The second voltage level varies as a function of the duty cycle of the PWM control signal.

Analog to digital converters 260 may sample the output voltage and convert the voltage level to a digital value that may then be feed back to the channel blocks 230. The digital value may be used to close a control feedback loop that locks the output voltage value to a desired value based upon the duty cycle of the PWM control signal.

Figure 3:
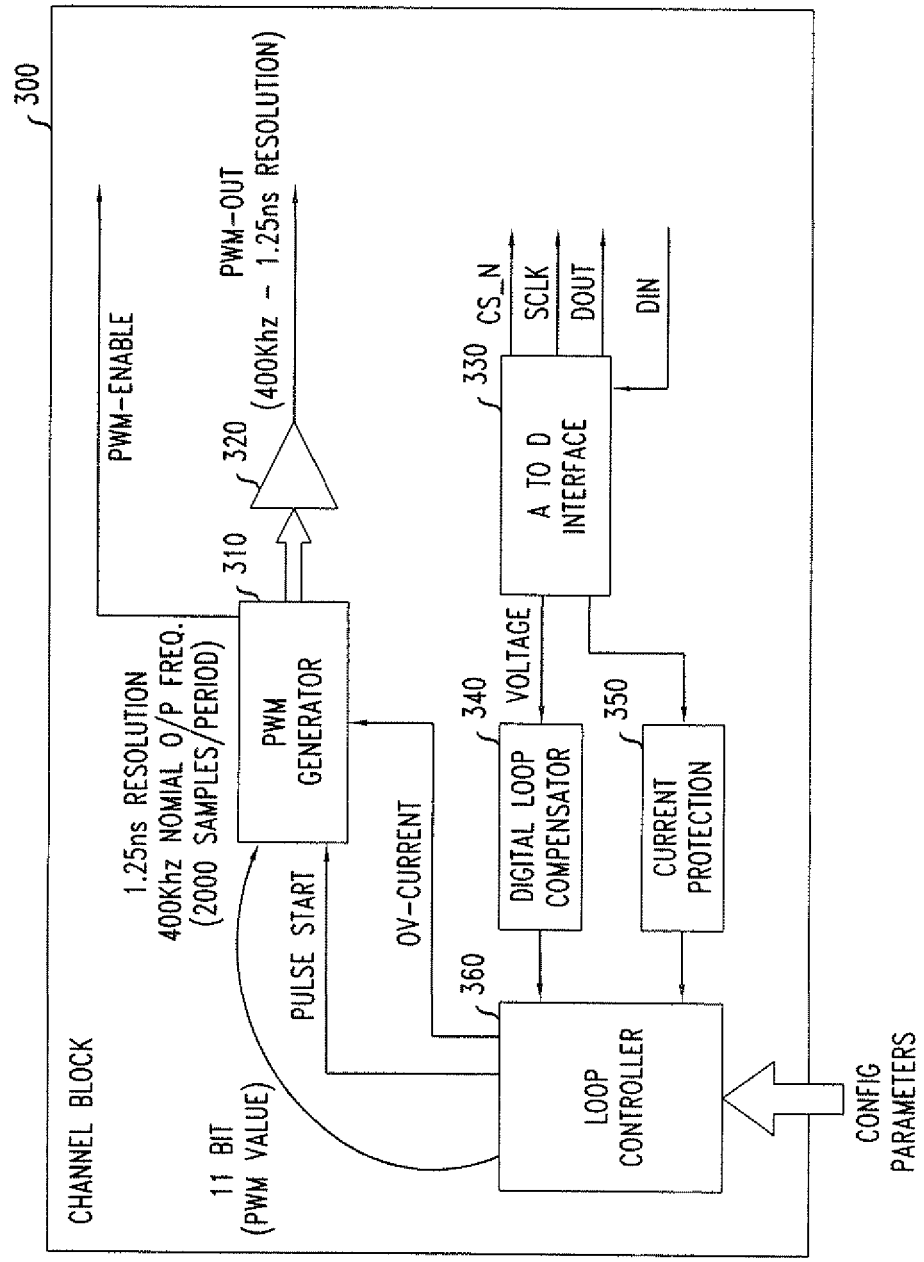
FIG. 3 illustrates a block diagram of an embodiment of the channel block.

FIG. 3 illustrates a block diagram of an embodiment of the channel block. The channel block 300 may include a PWM generator 310, a digital serializer 320, an analog to digital interface 330, a digital loop compensator 340, a current protection block 350, and a loop controller 360.

The digital serializer 320 takes in parallel data words and outputs a serial data stream. So for example, if the input to the digital serializer are 4 bit words at a 200 Mz rate, then the output will be a serial data rate of 800 Mz. This results in a pulsewidth of 1.25 ns. This pulsewidth specifies the time resolution that may be used in the PWM. FIG. 5 illustrates an example of the output from the digital serializer 300. The PWM has an on period of PWM ON and an off period of PWM OFF. For example if PWM ON is 128 pulses long and the PWM OFF is 1920 pulse long, the pulse repetition interval is 2048 pulses long, and the duty cycle is 128/2048 or 0.0625. In such a situation the PWM generator would send 32 consecutive 4 bit words of 1111 to generate the PWM ON portion of the PWM signal, followed by 480 consecutive 4 bit words of 0000 to generate the PWM OFF portion of the PWM signal. In another example, if PWM ON is 130 pulses long, the PWM generator would send would send 32 consecutive 4 bit words of 1111 and 1 word of 1100 followed by 479 consecutive 4 bit words of 0000 to generate the PWM ON and PWM OFF portions of the PWM signal. As is clear to one of skill in the art, various numbers of ON and OFF output pulses may be selected in order to implement the desired duty cycle and pulse repetition rate of the PWM control signal output by the channel block 300. Further, the above example illustrates a digital serializer 320 that receives 4 bit words, but the input words may be any number of bits to suit the specific hardware implementation of the digital serializer 320. For example, 8, 12, 24, 32, 48, or 64 bit input words may be used as inputs to the digital serializer 320.

The loop controller 360 may provide control information to the PWM generator 310. The loop controller may receive configuration parameters from the configuration parameter memory 220 (see FIG. 2). These provide information relating to the desired duty cycle and pulse repetition frequency of the PWM control signal. The loop controller 360 then sends control information to the PWM generator 310 so that the PWM generator can implement the desired duty cycle and pulse repetition frequency. The loop controller may also receive inputs from the digital loop compensator 340 and the current protection block 350. The digital loop compensator provides feedback to drive the output of the DC-DC converter to the desired value and is described further below. The current protection block 350 receives current information and determines if there is an over current situation and provides such information to the loop controller 360 which may then send an overcurrent signal OV-current to the PWM generator 310. Such a signal may cause the PWM generator to shut down to prevent damage to the DC-DC converter or any circuits that the DC-DC converter is powering.

The analog to digital interface 330 may receive data from a current sensing analog to digital converter and data from a voltage sensing analog to digital converter. The analog to digital interface 330 then provides voltage information to the digital loop compensator 340 and current information to the current protection block 350.

The digital loop compensator may implement a digital feedback loop filter. The digital feedback loop filter may be of any order needed in order to result in the desired system performance. The parameters for the digital feedback loop filter may be determined by the designer of the DC-DC power converter and these parameters may be stored in the configuration parameters memory 220. One advantage of the digital feedback loop is that it may be implemented with complex and/or imaginary poles. Such feedback filters cannot be implemented using discreet analog components. Therefore the designer has great flexibility in the feedback loop design.

Figure 4:
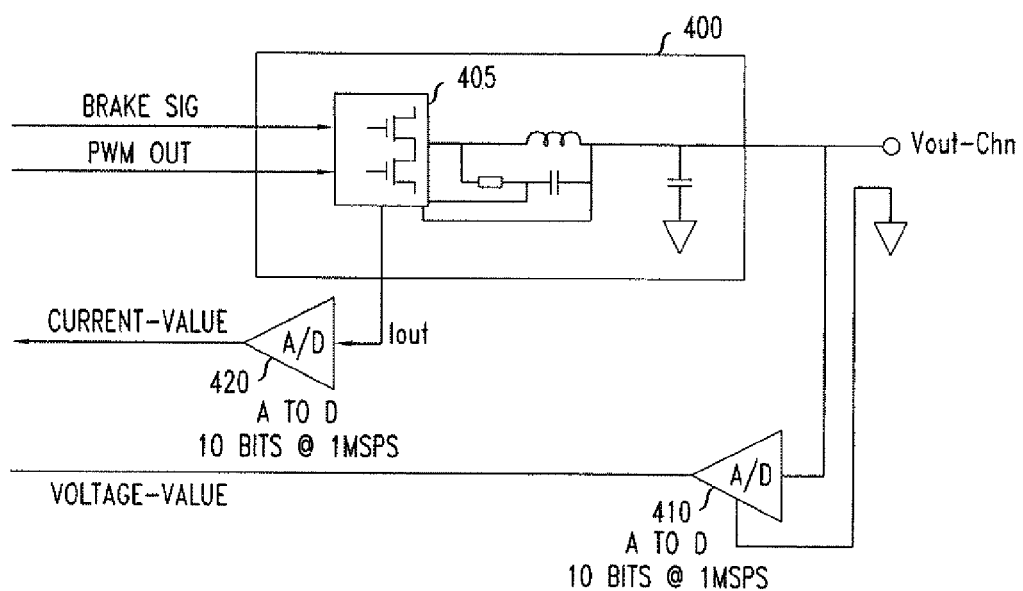
FIG. 4 illustrates another embodiment of a DC-DC converter circuit and feedback analog to digital converters.

FIG. 4 illustrates another embodiment of a DC-DC converter circuit and feedback analog to digital converters. The DC-DC converter circuit 400 includes a switch 405 and various other discreet circuit elements. As described above various circuits for implementing the DC-DC converter circuit 400 may be used and are well known to those of skill in the art. The voltage output of the DC-DC converter circuit 400 may be connected to an analog to digital converter 410 to produce a digital signal VOLTAGE_VALUE indicative of the voltage output from the DC-DC converter circuit 400. Another analog to digital converter 420 may receive an analog current signal from the DC-DC converter circuit 400 to produce a digital signal CURRENT-VALUE indicative of the current output from the DC-DC converter circuit 400. The outputs from the analog to digital converters 410, 420 may be feed to the channel block 300 to provide feedback control. The DC-DC converter circuit 400 may receive a PWM signal PMW-OUT from the channel block 300. The PWM signal PMW-OUT controls the output voltage level of the DC-DC converter circuit 400.

As discussed above the output clock rate of the digital serializer 320 may control resolution available to control the DC-DC converter. This clock rate specifies the smallest size pulse that may be output by the digital serializer 320 and hence the resolution to the widths of the overall output pulse from the digital serializer 320. As the digital loop controller 320 adjusts the duty cycle, for a fixed pulse repetition frequency the ON pulsewidth has a resolution of smallest pulse size produced by the digital serializer 320. Greater control of the duty cycle may be achieved by varying both the length of the PWM ON period as well as the PWM OFF period (the pulse repetition interval which equals PWM ON+PWM OFF accordingly varies as well). FIG. 6 illustrates an example of the output from the digital serializer when the PWM OFF period is adjusted.

FIG. 7 illustrates a table that shows how to vary the PWM ON and PWM OFF times to achieve a desired duty cycle. FIG. 7 is a table of duty cycle as a function of the PWM ON time (the first column) versus the pulse repetition interval (the first row). For example say the initial desired duty cycle is 0.0625. This may be implemented by using PWM on time of 128 bits with a pulse repetition interval of 2048 bits. As the DC-DC converter operates, the digital loop compensator determines that the PWM ON time should be 127.6 bits which leads to a duty cycle of 127.6/2048=0.062305. If only the PWM ON time is varied the best option remains 128 for PWM ON as 127 (0.062012) and 129 (0.063988) are further from 0.062305. But as shown in the table, if the pulse repetition interval may be varied then a PWM time of 128 with a pulse repetition interval of 2049 may be used to obtain a duty cycle of 0.062469 which is closer than 0.0625. Further, variations of PWM on time and pulse repetition interval may be considered. For example a PWM time of 127 with a pulse repetition interval of 2038 may be used to obtain a duty cycle of 0.062315 resulting in a nearly identical duty cycle to the desire duty cycle. Accordingly, as the digital loop compensator varies the duty cycle to obtain the desired output voltage, both the PWM ON and PWM OFF time may be varied to determine the best PWM settings. This determination may be done by a table search, where a table of potential PWM ON and pulse repetition intervals around a desired operating point may be pre-calculated and stored in the configuration parameters memory 220. The size of the table may be driven by the expected variation in the PWM duty cycle. Alternatively, various alternatives may be calculated during operation to determine the best set of parameters to use to achieve the desired duty cycle.

The digital PWM controller embodiments described above have various following advantages. The core design for the feedback loop compensation may be done using discrete time analysis in the Z domain and second or third or fourth order (or even higher orders) compensation feedback loops for optimum feedback loop response may be used.

The use of a centralized FPGA may provide over 40 PWM channels to control the MOSFET switches in the DC-DC converters. The only limits on the number of channels is the number of pins available to use in the FPGA.

Further, inherent digital noise generated from the PWM bit resolution may be reduced. In an example provided above, the digital serializer may run at 800 Mhz, thus 1.25 ns resolution may be achieved. Also, higher speeds may be possible.

Because the Digital compensation loop is implemented in the discrete domain using the Z transform, the DSP block inside the FPGA may easily be utilized. Also, feed forward is part of the compensation loop which will improve response to any rail changes/ripple not being reflected to the Vout rails.

Multiphase may be applied in a flexible way by groups of identical channels and there may be a current feedback loop to guarantee current sharing, and the PWM may be phase staggered to decrease ripple current.

The application for these DC-DC controllers may be intended for heavily loaded rails, and efficiency at light load may not be a concern. The embodiments above may detect the present of light loads and then switch to discontinuous mode. The parameters for such operation may also be determined ahead of time and stored in the configuration parameters memory 220. Either the digital loop compensator 240 or the loop controller 360 may determine that a light load is present, and switch the control to a discontinuous mode.

Additionally, all parameters like tracking, power up slew rate, under/over voltage, voltage out trimming, maximum current permitted, hiccup versus latch of current protection may be stored in the configuration parameters memory 220 and may be programmed for every channel. Also, digital compensation parameters to adjust gain and phase margins may also be pre-calculated and stored in the configuration parameters memory.

The use of a digital serializer as described in the embodiments above presents a scalable mechanism to use standard digital serializer based building blocks to generate a PWM. Any pulse pattern with a resolution defined by the minimum bit time of the digital serializer may be created using this mechanism.

Further, past analog solutions all require specialized analog circuits and therefore may be limited in the number of DC-DC power blocks/(PWMs) they can control. The embodiments described above scale much more easily because it uses standard digital serializer cells to produce the PWM signals.

It should be apparent from the foregoing description that various exemplary embodiments of the invention may be implemented in hardware and/or software running on hardware. Furthermore, various exemplary embodiments may be implemented as instructions stored on a machine-readable storage medium, which may be read and executed by at least one processor to perform the operations described in detail herein. A machine-readable storage medium may include any mechanism for storing information in a form readable by a machine, such as a personal or laptop computer, a server, or other computing device. Thus, a tangible and non-transitory machine-readable storage medium may include read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be effected while remaining within the spirit and scope of the invention. Accordingly, the foregoing disclosure, description, and figures are for illustrative purposes only and do not in any way limit the invention, which is defined only by the claims.

What is claimed is:

1. A method performed by a pulsewidth modulation (PWM) controller, the method comprising:
   receiving a control input including PWM parameters;
   producing inputs to a digital serializer, wherein the inputs result in a digital serializer output that is pulsewidth modulated according to the PWM parameters;
   receiving current and voltage sense data to be included in a feedback control input; and
   modifying inputs to the digital serializer based upon the feedback control input.

2. The method of claim 1, wherein the producing inputs to the digital serializer includes producing plurality of digital words to produce the pulsewidth modulated output.

3. The method of claim 1, wherein the feedback control input includes digitally filtering the pulsewidth modulated output.

4. The method of claim 3, further comprising receiving digital filter parameters to digitally filter the pulsewidth modulated output.

5. The method of claim 1, wherein modifying input to the digital serializer includes determining a modified duty cycle of the PWM modulation and selecting an ON time and OFF time of the PWM modulation resulting in a duty cycle nearest to the modified duty cycle.

6. The method of claim 5, where selecting the ON time and OFF time includes searching a table of ON and OFF times.

7. A method performed by a pulsewidth modulation (PWM) controller including a digital serializer, the method comprising:
   receiving a control input including PWM parameters;
   determining N and M based upon the PWM parameters, wherein N is the number of ON discreet time periods and M is the number of OFF discreet time periods where M+N discreet time periods correspond to a pulse repetition interval;
   producing a plurality of digital serializer input data words corresponding to N ON discreet time periods and M OFF discreet time periods;
   applying the plurality of digital serializer input data words to the digital serializer to produce a PWM signal having an initial duty cycle;
   altering N and determining a desired duty cycle based on a feedback control input; and
   varying the pulse repetition interval to result in a duty cycle close to the desired duty cycle.

8. The method of claim 7, further comprising:
   receiving a feedback control input; and
   modifying the plurality of digital serializer inputs to the digital serializer based upon the feedback control input.

9. The method of claim 8, wherein the feedback control input includes digitally filtering the pulsewidth modulated output.

10. The method of claim 9, further comprising receiving digital filter parameters to digitally filter the pulsewidth modulated output.

11. The method of claim 8, wherein modifying the plurality of digital serializer inputs to the digital serializer includes determining a modified duty cycle of the PWM modulation and selecting an ON time and OFF time of the PWM modulation resulting in a duty cycle nearest to the modified duty cycle.

12. The method of claim 11, where selecting the ON time and OFF time includes searching a table of ON and OFF times.

13. A pulsewidth modulation (PWM) controller comprising:
   a digital serializer configured to receive a parallel input data stream and to produce a output serial data stream based upon the input parallel data stream; and
   a loop controller including an output connected to the digital serializer and an input configured to receive current and voltage sense data to be included in a feedback control input,
   wherein the loop controller is configured to output a parallel input data stream to the digital serializer based upon the feedback control input and wherein the output serial data stream from the digital serializer has desired PWM parameters.

14. The PWM controller of claim 13, wherein the parallel input data stream includes a plurality of digital words to produce the pulsewidth modulated output.

15. The PWM controller of claim 13, further comprising a digital filter configured to filter the pulsewidth modulated output.

16. The PWM controller of claim 15, wherein the digital filter is configured to receive digital filter parameters to digitally filter the pulsewidth modulated output and to provide a feedback signal to the loop controller.

17. The PWM controller of claim 13 wherein the loop controller is configured to determine a modified duty cycle of the PWM modulation and to select an ON time and OFF time of the PWM modulation resulting in a duty cycle nearest to the modified duty cycle.

18. The PWM controller of claim 17, where selecting the ON time and OFF time includes searching a table of ON and OFF times.

* * * * *